April 18, 1939.  W. P. ABELL,  2,154,425
TRIMMING MACHINE
Original Filed Oct. 14, 1937   2 Sheets-Sheet 1

INVENTOR
Walter P. Abell
By his Attorney
Harlow M. Davis

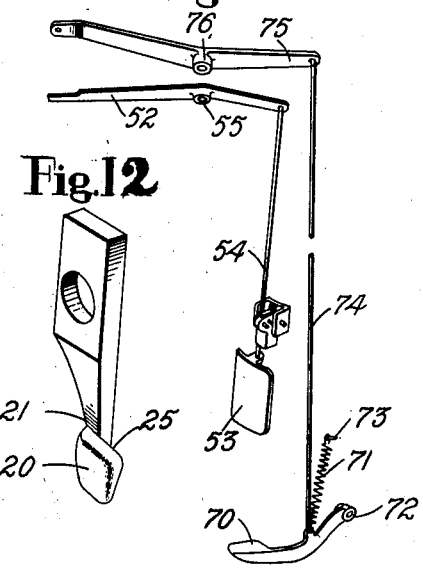
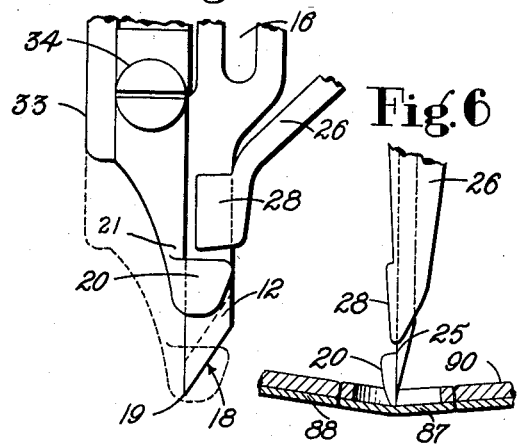
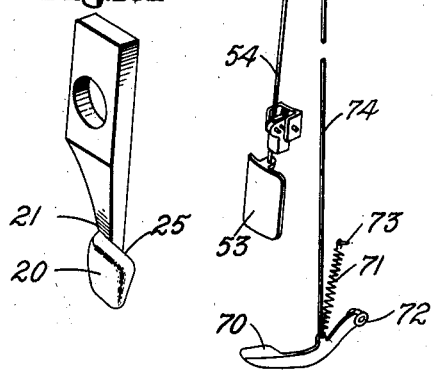
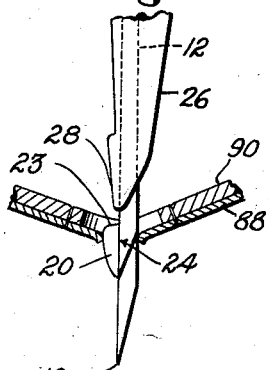
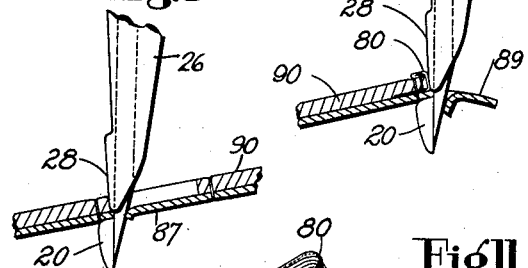
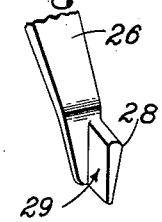
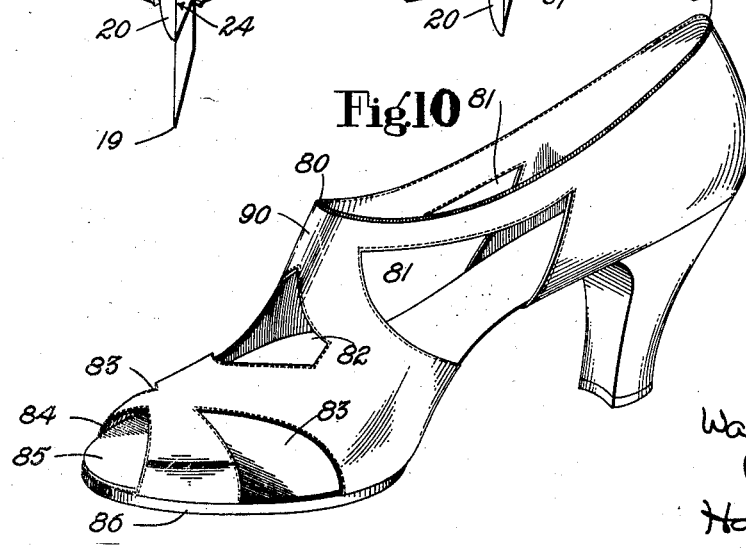

Patented Apr. 18, 1939

2,154,425

UNITED STATES PATENT OFFICE 2,154,425

TRIMMING MACHINE

Walter P. Abell, Quincy, Mass., assignor to United Shoe Machinery Corporation, Paterson, N. J., a corporation of New Jersey Application October 14, 1937, Serial No. 168,919
Renewed June 10, 1938

11 Claims. (Cl. 164—47)

This invention relates to trimming machines, and is concerned primarily with certain problems of trimming the linings of fabricated shoes having openwork uppers, that is, uppers provided with ornamental openings or cutouts and uppers of skeleton construction or strap-sandal design.

To prevent distortion of such uppers as a result of lasting stresses, their linings are not initially cut out or skeletonized but are stitched to the outer layer of material not only along the outer margins of the uppers but also along the margins that define the ornamental openings in the outer layer. Finally, when the shoes are otherwise completed, it becomes necessary not only to trim the linings along the outer edges of the uppers but also to cut out the panels or portions of lining that are no longer needed to preserve the shapes of the uppers.

Although various types of trimming machines have been in commercial use for such purposes, they have fallen a little short of fulfilling certain requirements under certain conditions. One of these requirements is that their cutters should not, under any circumstances, subject an operator to risk of injury. Another is that they should be capable of severing panels of lining in the plane of the bottom of the insole, as in a sandal in which the ornamental openings extend to the latter plane. No machine heretofore provided has fulfilled both of these requirements.

Accordingly, to satisfy these in addition to other requirements of a machine for the purposes above set forth, the present invention provides an improved trimming machine embodying the novel features hereinafter described and claimed.

The invention is predicated upon double use of a power-operated cutting blade, first to stab an incision in the lining, and thereafter to do the actual trimming with a cut that progresses from the initial incision. Accordingly, the illustrated machine comprises a manually displaceable work-supporting member of unique shape, a small portion of which normally masks the cutting end of the blade to safeguard the operator against being stabbed. The work-supporting member is arranged to be shifted manually toward the opposite end of the blade far enough to unmask the cutting end thereof and thereby render it temporarily effective to stab the lining and thus form an initial incision therein. The masking portion is so proportioned, with regard to the cutting end of the blade, that it may readily pass through the initial incision while returning to its normal masking position, thereby establishing safe operating conditions required for the actual trimming. Also, the masking portion is provided with a shearing edge arranged to lie in shearing relation to the cutting blade when the trimming relation is established.

The illustrated machine also comprises a thin trimming guide for controlling the course of the trimming and arranged to project between the cutting blade and the contiguous finished edge of the upper, whether that edge is an outer edge or one that defines an ornamental opening. Although corresponding guides have been used in former machines for similar operations, the present invention comprises a novel feature that provides for displacing the guide from the path of movement of the aforesaid masking portion whenever the latter is shifted to unmask the cutting end of the blade. Conversely, this feature also provides for returning the giude to its operative position when the masking portion is returned to its masking position.

The novel features of the invention are organized to provide an all-purpose trimming machine, so called because it fulfills the requirements not only of top-trimming (i. e. outer margins) but also of panel-trimming and strap-sandal work. No one machine heretofore provided has been suitable for cut-out work in addition to top-trimming, except a machine that subjects the operator to constant danger of being stabbed by an unmasked point required for cut-out work.

Referring to the drawings,

Fig. 4 is a perspective view including a treadle, a knee-lever and connections to be operated thereby;

Fig. 5 is an elevation, on a magnified scale, including the trimming cutter, the cutter guard and the trimming guide;

Fig. 6 is an edge view of the parts represented in Fig. 5 and includes a portion of a shoe-upper in section to illustrate the step of presenting a panel of lining to be stabbed and thereafter cut out;

Fig. 7 is a view similar to Fig. 6 but represents the panel as having been stabbed to provide an initial incision therein;

Fig. 8 is a view similar to Fig. 6 but represents the conditions of actual trimming to cut out the panel of lining;

Fig. 9 is a view similar to Fig. 8 except that an outer margin of the upper is in process of being trimmed;

Fig. 10 is a perspective view of a shoe of skeleton construction typifying the various trimming problems with which the present invention is concerned;

Fig. 11 is a perspective view (enlarged) of the work-supporting member; and

Fig. 12 is a perspective view (enlarged) of the work-engaging portion of the trimming guide.

Figure 1:
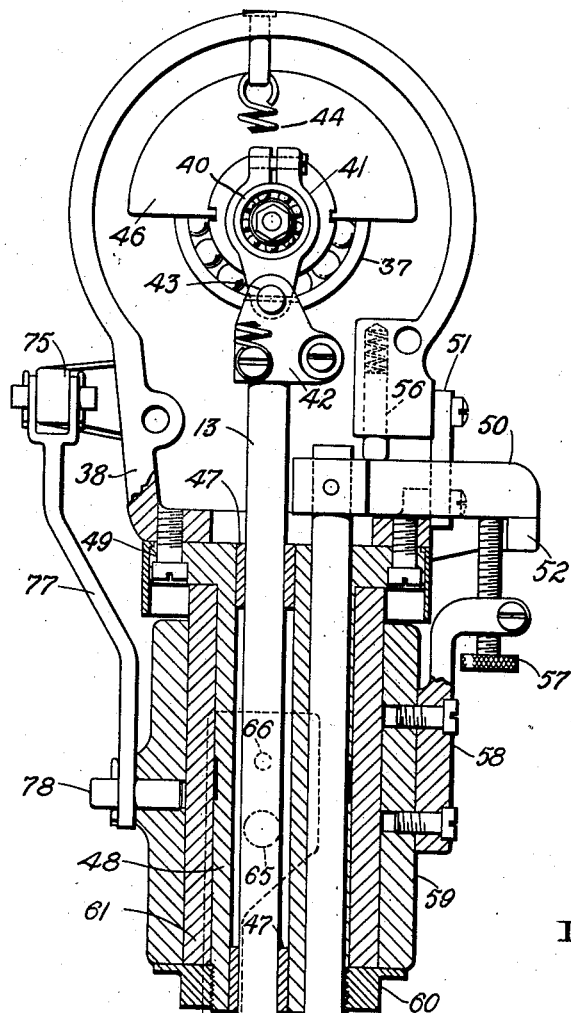
Fig. 1 is a vertical section of the trimming mechanism and adjacent parts of a machine embodying the present invention.

The machine herein illustrated is predicated upon an organization similar to that of the machine illustrated in United States Letters Patent No. 1,700,624, granted June 29, 1929, on an application of George Boulton. Some of the features of the machine illustrated in this Boulton patent are omitted for the purposes of the present invention and certain novel features, hereinafter described, are added.

The cutting blade 12 projects downwardly from the lower end of a vertically movable bar or plunger 13 to which it is connected by an intermediate block 14 that has horizontal tongue-and-groove connection with the bar and is adjustably affixed thereto by a screw 15 extending through a slot that provides for its horizontal adjustment. The butt end of the blade 12 is provided with a vertical slot 16 through which two clamping screws 17 extend to clamp the blade against the block 14 with provision for adjusting the blade vertically. The lower end of the blade 12 is sharpened to provide a cutting edge 18 coextensive with the width of the blade and preferably arranged to lie in oblique relation to its path of reciprocation. The blade is thus provided with a sharp point 19 suitable for stabbing an incision in a panel of lining. The down-stroke of the blade is utilized not only for stabbing but also for trimming the lining of a shoe. The work-engaging portion of the blade is preferably not more than ⅛ of an inch in width and the operating stroke not more than 3/32 of an inch.

Under normal conditions the pointed end of the blade is masked throughout its range of motion by an offset portion 20 of a guard that projects downwardly from a supporting bracket 33 and is affixed thereto by a screw 34. One purpose of the offset masking portion 20 is to protect the operator from being stabbed by the blade 12. The lower edge of the portion 20 is blunt as represented in Figs. 6 to 9, inclusive, although this portion is wedge-shaped to facilitate its passage through an incision in a panel of lining (Fig. 7) under certain conditions hereinafter described. For this reason the cross-section of the masking portion 20 is but little greater than that of the cutting portion of the blade, the difference in width being due to the narrow shank 21 of the guard which is no thicker than the blade and is arranged in flush relation thereto and against the back edge thereof from which the trimmed work is fed. Consequently, although the shank 21 may extend through an incision in the work, it does not hinder feeding movement thereof either on straight trimming or on curved trimming.

Another purpose of the portion 20 is to support the lining against the downward thrust of the blade 12 while the trimming operation is in progress. For this purpose the upper face 23 of the portion 20 is wide enough to fulfill the work-supporting requirement and is preferably inclined slightly in accordance with the inclination of the work as pictured in Figs. 8 and 9. A flat vertical face 24 of the masking portion 20 lies in contact with one face of the blade 12, and the faces 23 and 24 meet to provide an acute-angular shearing edge 25 with which the cutting edge 18 cooperates to trim the lining with a shearing cut. The adjustable connection including the screw 15 (Figs. 1 and 2) provides for locating the blade against the edge 25.

A trimming guide 26 affixed to the lower end of a vertically movable stem 27 projects downwardly therefrom and is provided with a thin work-engaging tongue 28 that lies in contact with the blade 12 immediately above the masking portion 20 of the cutter-guard. The lower edge of the tongue 28 and the work-supporting surface 23 are spaced to form a work-guiding channel only deep enough to receive the lining without hindrance to feeding the work, but the tongue is arranged to prevent the outer layer of an upper from being attacked by the cutting blade (see Figs. 8 and 9) and is likewise effective to control the course of the trimming under all conditions of use. The tongue 28 is preferably so thin as to permit trimming the lining in virtually flush relation to the outer layer of the upper. The trimming guide 26 is connected to the stem 27 by an intermediate block 30 that has horizontal tongue-and-groove connection with the stem and is adjustably affixed thereto by a screw 31 extending through a slot. The trimming guide is adjustably affixed to the block 30 by a clamping screw 32. These adjustable connections provide for locating the face 29 of the lip 28 (Fig. 11) against the confronting face of the blade 12.

The cutter-bar 13 has fixed limits of reciprocation derived from a wrist-pin 35 carried by a continuously driven shaft 36. This shaft is mounted in ball-bearings one of which is indicated at 37 in Fig. 2. The shaft and its bearings are enclosed in a hollow frame 38 of the same general type as that represented in the aforesaid Boulton patent, and the shaft may be driven by an electric motor and a connecting belt arranged as represented in Fig. 3 of the drawings in United States Letters Patent No. 1,933,583, granted November 7, 1933 on another application of said George Boulton. For purposes of the present invention, the shaft 36 is preferably driven at a speed of about 3600 R. P. M.

The connections for operating the cutter-bar 13 include a ball-bearing 40 arranged on the wrist-pin 35, an eccentric-strap 41 in which the ball-bearing is clamped, a block 42 affixed to the upper end of the bar 13, and a pivot pin 43 connecting the strap 41 and the block. To permit high speed of operation and at the same time to minimize vibration, a tension spring 44 is arranged to counteract the weight of the load carried by the wrist-pin 35. The lower end of this spring is connected to the block 42 and the upper end is attached to an anchoring pin 45. For the same reason the shaft 36 is provided with a counterweight 46 arranged to balance the load carried by the wrist-pin.

The cutter-bar 13 is arranged to slide in bearings provided by bushings 47 inserted into a bore in a cylindrical member 48. This member is affixed to the frame 38 by screws 49. The member 48 is also bored to provide a bearing in which the stem 27 may slide to raise and lower the trimming guide 26. A finger 50 pinned or otherwise affixed to the upper end of the stem 27 projects outwardly through an opening in the frame 38 and is flanked by two cooperative guide-bars one of which is indicated at 51 in Fig. 1. These bars are affixed to the frame 38 and engage the finger 50 to prevent the stem 27 from turning about its axis while permitting it to move up and down. The outboard end of the finger 50 overlies one end of an operating lever 52 by which the trimming guide 26 may be raised to clear a seam of a lining when the seam is about to pass the cutting blade.

As shown in Fig. 4, the lever 52 is connected to a knee-lever 53 by a connecting rod 54 according to the corresponding mechanism illustrated in the aforesaid Boulton Patent No. 1,700,624. The lever 52 is provided with a boss 55 bored to provide for mounting it on a fulcrum-pin (not shown) by which it may be connected to the frame 38. The trimming guide 26 is normally depressed by a spring-pressed follower 56 (Fig. 1) arranged to bear on the finger 50 and located in a bore in the frame 38. The knee-lever 53 is likewise spring-pressed to have the same depressing effect. The normal level of the trimming guide may be regulated according to the thickness of the lining by a stop-screw 57 arranged to abut the underside of the finger 50. This screw is carried by a bracket 58 affixed to a vertically movable sleeve 59.

An intermediate sleeve 61 surrounding the member 48 and affixed thereto by a set-screw 62 (Fig. 3) provides a bearing for the movable sleeve 59 and serves also to prevent the latter from turning about its axis, since the cutter-guard 20 should not be capable of any turning movement. Accordingly, a connection equivalent to a spline connection is provided by horizontal bars 63 affixed to the sleeve 59, one near its upper end (Fig. 2) and one at its lower end, and both arranged to engage a flat vertical face 64 formed on the intermediate sleeve.

Figure 2:
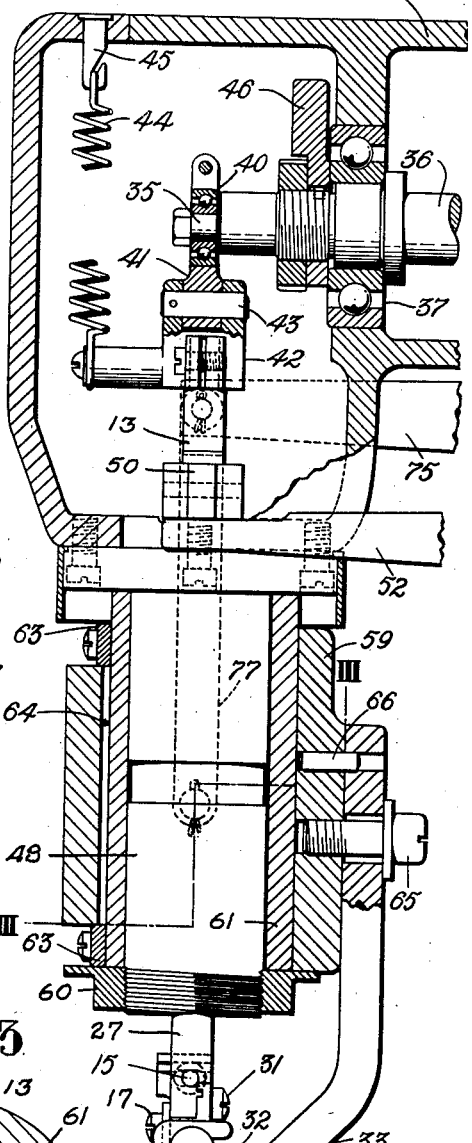
Fig. 2 is a vertical section of the same mechanism in a plane at right angles to that of Fig. 1.
Figure 3:
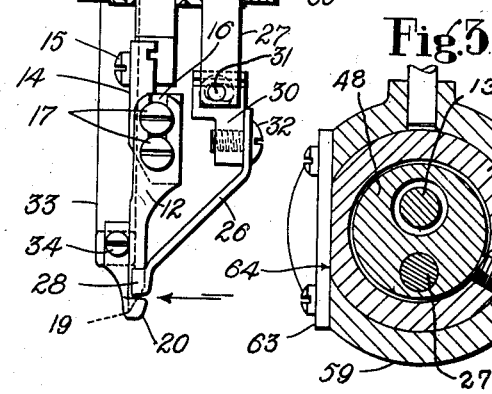
Fig. 3 is a horizontal section of the structure intersected by line III—III in Fig. 2.

As shown in Fig. 2 the bracket 33 is rigidly attached to the sleeve 59 by a clamping screw 65 and a dowel 66. To provide for stabbing a panel of lining the machine is provided with a treadle 70 (Fig. 4) normally raised by a tension spring 71. The boss 72 of this treadle is bored to receive a fulcrum-pin by which the treadle may be connected to the base or column of the machine.

The upper end of the spring 71 is attached to an anchoring pin 73. A rod 74 provides an operating connection from the treadle 70 to one end of a lever 75 having a boss 76 bored to receive a portion of the fulcrum-pin on which the lever 52 is mounted. The other end of the lever 75 is connected to the sleeve 59 by a link 77 (Figs. 1 and 2), the connection with the sleeve being provided by a pivot-pin 78. By means of the connections just described, the spring 71 (Fig. 4) normally returns the cutter-guard 20 to its lowest level as shown in Figs. 1, 2, 6, 8 and 9 and also represented by broken lines in Fig. 5. This level is established by a nut 60 screwed on the barrel 48 to provide a seat for the sleeve 59.

In all the figures that include the cutting blade 12, the blade is represented as occupying its lower limit of travel. Consequently, it will be apparent that so long as the guard 20 remains in its normal position, it will mask the lower extremity of the cutting blade and thus protect the operator against being stabbed thereby. On the other hand, when it is desired to use the blade 12 to cut out a panel 87 of lining 88 from an opening in an upper 90, the operator will first depress the treadle 70 to raise the guard 20 to the position represented in Fig. 7 and likewise represented in solid lines in Fig. 5. The lower extremity of the blade 12 will thus be unmasked or exposed so that it may be used to stab the panel and thereby form an incision through which the masking portion 20 may pass as pictured in Fig. 7.

When the guard 20 is raised as above described, the trimming guide 26 likewise partakes of the upward movement of the sleeve 59 by reason of the train of connections including the bracket 58, screw 57, finger 50 and the stem 27. Although this train of connections raises the trimming guide 26 whenever the guard 20 is raised, it nevertheless provides for raising the guide 26 individually without raising the guard 20.

The shoe represented in Fig. 10 is a typical example of work comprising a variety of trimming problems all of which may be satisfactorily dealt with by a machine embodying the features hereinbefore described. Although this shoe is represented as having had all surplus portions of lining 88 trimmed off, it is to be understood that prior to being trimmed, an outer margin 89 (Fig. 9) of the lining projected beyond the top edge 80 of the foot-receiving opening and that the ornamental openings 81, 81, 82, 83, 83 and 84 were originally closed by panels 87 (Figs. 6, 7 and 8) of the lining. In a shoe of this type the lining 88 as well as the outer layer 90 of upper material is provided with a lasting margin that lies between the insole 85 and the outsole 86. Consequently, when severing a panel of lining from an ornamental opening that extends to the junction between the insole and the outsole, as in the case of the openings 81, 83 and 84, it is necessary to sever the corresponding panels of lining virtually flush with the lower surface of the insole. The trimming mechanism herein shown and described is adapted to fulfill this requirement in addition to trimming an outer margin 89 of the lining flush with the top edge 80 and severing a panel from an ornamental opening such as the opening 82 that does not extend to the junction of the soles.

When the described machine is to be used for top-trimming, it is not necessary to raise the masking guard 20 because a trimming operation of this kind may begin at the edge of the lining rather than at a point within the original boundaries of the lining. Accordingly, to trim the outer margin 89 of the lining flush with the top edge 80 as represented in Fig. 9, the operator will present that margin of the lining to the cutting blade between the guard 20 and the lip 28 of the guide and will feed the work in the direction indicated by the arrow in Fig. 1, at the same time guiding the shoe in a direction to cause the trimming cut to run diagonally across the margin until the top edge 80 of the upper abuts against the lip 28. Thereafter, the edge 80 will run along the lip 28 and the course of trimming will be controlled accordingly until the circuit of the top edge has been completed. If, in the course of such trimming, a seam comprising two layers of lining is encountered, interruption of the feeding movement may be avoided by momentarily raising the trimming guide 26 while the relatively thick portion of the lining is passing under it. The knee-lever 53 shown in Fig. 4 is provided with stops to limit its range of movement, to the end that it will not be possible to raise the trimming guide so far as to lose control of the outer layer.

Assuming now that the machine is to be used to sever a panel of lining such as that indicated at 87 in Fig. 6, the operator may first raise the panel against the lower edge of the masking guard 20 as pictured in this figure. The initial point of contact between the panel and the guard should be far enough from the nearest edge of the ornamental opening to avoid cutting that edge during the preliminary stages that precede the actual trimming. Having located the panel with regard to this requirement, the operator may depress the treadle 70 to raise the guard 20 to the position represented in solid lines in Fig. 5, at the same time raising the shoe by hand. Since the cutting blade 12 is in operation and its lower extremity is now unmasked, it will stab the panel of lining to form an incision therein. The operator may feed the shoe a short distance while this incision is being formed and thereby elongate it to facilitate spreading it as pictured in Fig. 7. The operation of the cutting blade is so rapid that the operator may release the treadle immediately whereupon the masking portion 20 of the guard will pass through the incision and return to its masking position represented in broken lines in Fig. 5. Since both the cutting blade and the masking guard will now project through the panel, the operator will locate the lining on the upper face 23 of the guard and feed the shoe in a direction that will cause the course of trimming to run diagonally toward the edge of the ornamental opening that lies at the left-hand side of the cutting blade. This edge will thus be brought against the lip 28 of the trimming guide as pictured in Fig. 8, and the severing of the panel may progress under control of the lip 28 until a complete circuit of the ornamental opening has been traversed.

If the ornamental opening extends to the junction of the insole and the outsole, the course of the trimming along that juncture will be controlled either by contact of the outsole with the lip 28 or by contact of the insole with the guard 20 or by both. If, in the course of cutting out a panel, two lapped portions thereof forming a seam are brought to the trimming locality, the trimming guide may be momentarily raised by the knee-lever 53 as hereinbefore described, without retracting the guard 20 from its masking position. When a panel has been completely severed, the operator has merely to lower the shoe to clear it from the trimming mechanism.

Having thus described the invention, what is claimed as new and desired to be secured by Letters Patent of the United States is:

1. A trimming machine comprising a cutting blade having a cutting edge at one end, power-driven means for reciprocating said blade endwise, a cutter-guard having a portion arranged to engage a face of, and mask the cutting end of, said blade when the latter is at the terminal limit of its cutting stroke, said cutter-guard being manually movable from its end-masking position to shift said masking portion along said blade toward the opposite end thereof far enough to unmask said cutting end, and said masking portion having a shearing edge arranged to lie in shearing relation to said cutting edge when the guard stands in the aforesaid end-masking position.

2. A trimming machine as defined in claim 1, in which the cutting end of said blade is pointed to facilitate preliminary piercing of an article of work.

3. A trimming machine as defined in claim 1, in which said cutting edge of the blade is co-extensive with the width thereof and lies in oblique relation to its path of reciprocation.

4. A trimming machine as defined in claim 1, in which a spring is arranged to return the cutter-guard to the end-masking position specified.

5. A trimming machine as defined in claim 1, in which the cross-section of the masking portion is so nearly commensurate with that of the cutting portion of the blade that both the blade and the masking portion may readily pass through an incision cut in an article of work by the blade.

6. A trimming machine as defined in claim 1, in which the masking portion is blunt to avoid inflicting personal injury if struck on end.

7. A trimming machine as defined in claim 1, in which the cutting blade is arranged to cut with down-strokes first to stab an incision in a panel of the lining of a fabricated shoe presented under said masking portion, and thereafter to sever the panel as it is fed horizontally along the upper edge of said masking portion.

8. A trimming machine as defined in claim 1, in which the cutter-guard comprises a slender shank portion that lies in contiguous relation to a longitudinal edge of the cutting blade, and in flush relation to the latter.

9. A trimming machine comprising the combination defined in claim 1, and a manually displaceable trimming guide arranged to cooperate with said shearing edge of the masking portion of the guard to form a narrow work-guiding channel through which a thin layer of the work may be fed at the trimming locality.

10. A trimming machine comprising the combination defined in claim 1, and a trimming guide arranged to cooperate with said shearing edge of the masking portion to form a narrow work-guiding channel through which a layer of the work may be fed, and means by which said trimming guide is displaced from its operative position when the cutter-guard is shifted as aforesaid to unmask the cutting end of said blade.

11. A trimming machine comprising a cutting blade having a cutting edge at its lower end to cut with downstrokes, mechanism for operating said blade with up and down strokes, a cutter-guard having a portion arranged normally to mask the lower portion of said blade, a trimming guide arranged above and spaced from said masking portion to provide a narrow work-guiding channel, manually operable means by which both said cutter-guard and said trimming guide may be raised to unmask the lower portion of said blade, and other manually operable means by which said trimming guide may be raised individually.

WALTER P. ABELL.